Feb. 16, 1954     L. S. WILLIAMS     2,669,154
MAGNIFYING VIEWER FOR WEIGHING SCALES
Filed March 24, 1949     6 Sheets-Sheet 1
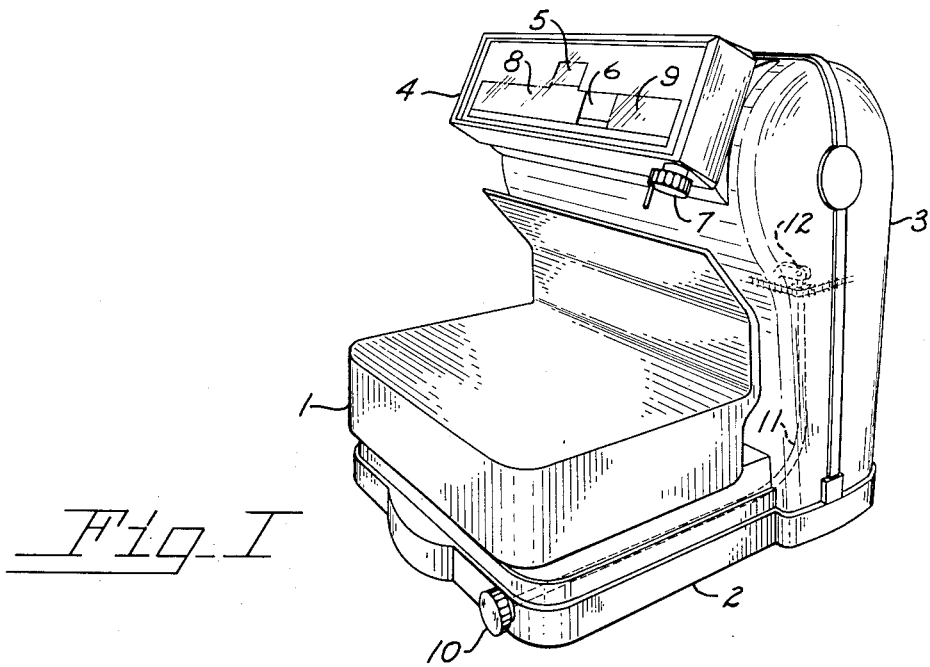
Fig. I
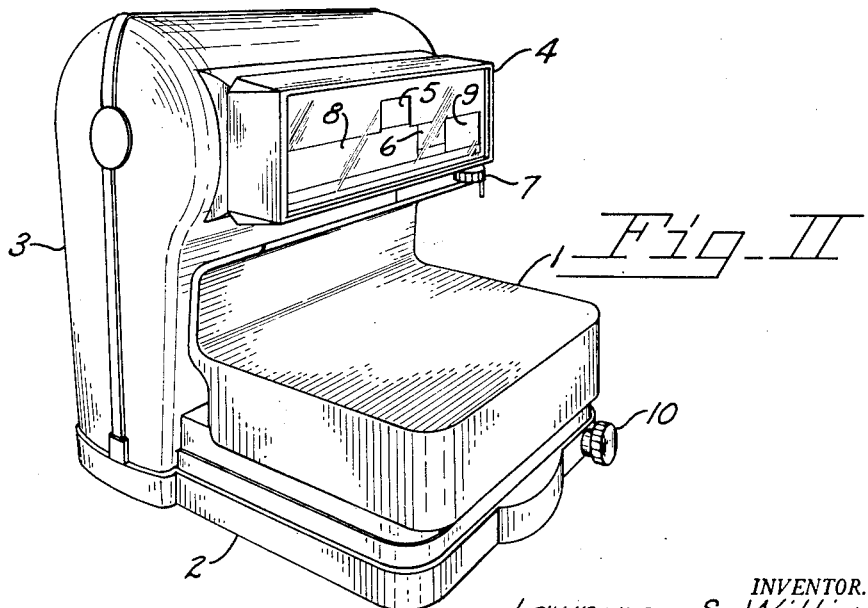
Fig. II
INVENTOR.
Lawrence S. Williams
BY
Marshall, Marshall & Leonard
ATTORNEYS Feb. 16, 1954   L. S. WILLIAMS   2,669,154
MAGNIFYING VIEWER FOR WEIGHING SCALES
Filed March 24, 1949   6 Sheets-Sheet 2
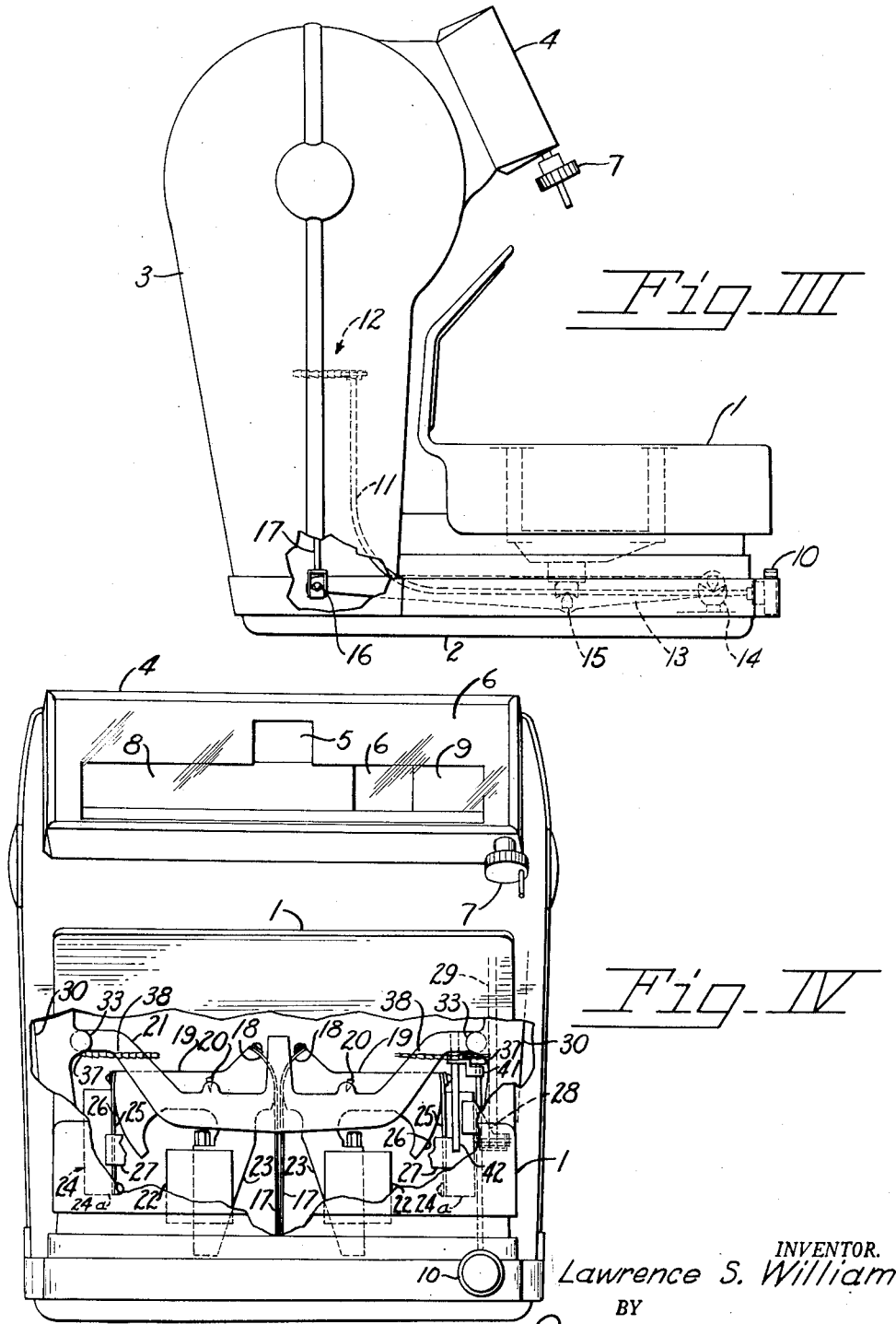
INVENTOR.
Lawrence S. Williams
BY
Marshall, Marshall & Leonard
ATTORNEYS Feb. 16, 1954　　　　　L. S. WILLIAMS　　　　　2,669,154
MAGNIFYING VIEWER FOR WEIGHING SCALES
Filed March 24, 1949　　　　　　　　　　　　　　6 Sheets-Sheet 3
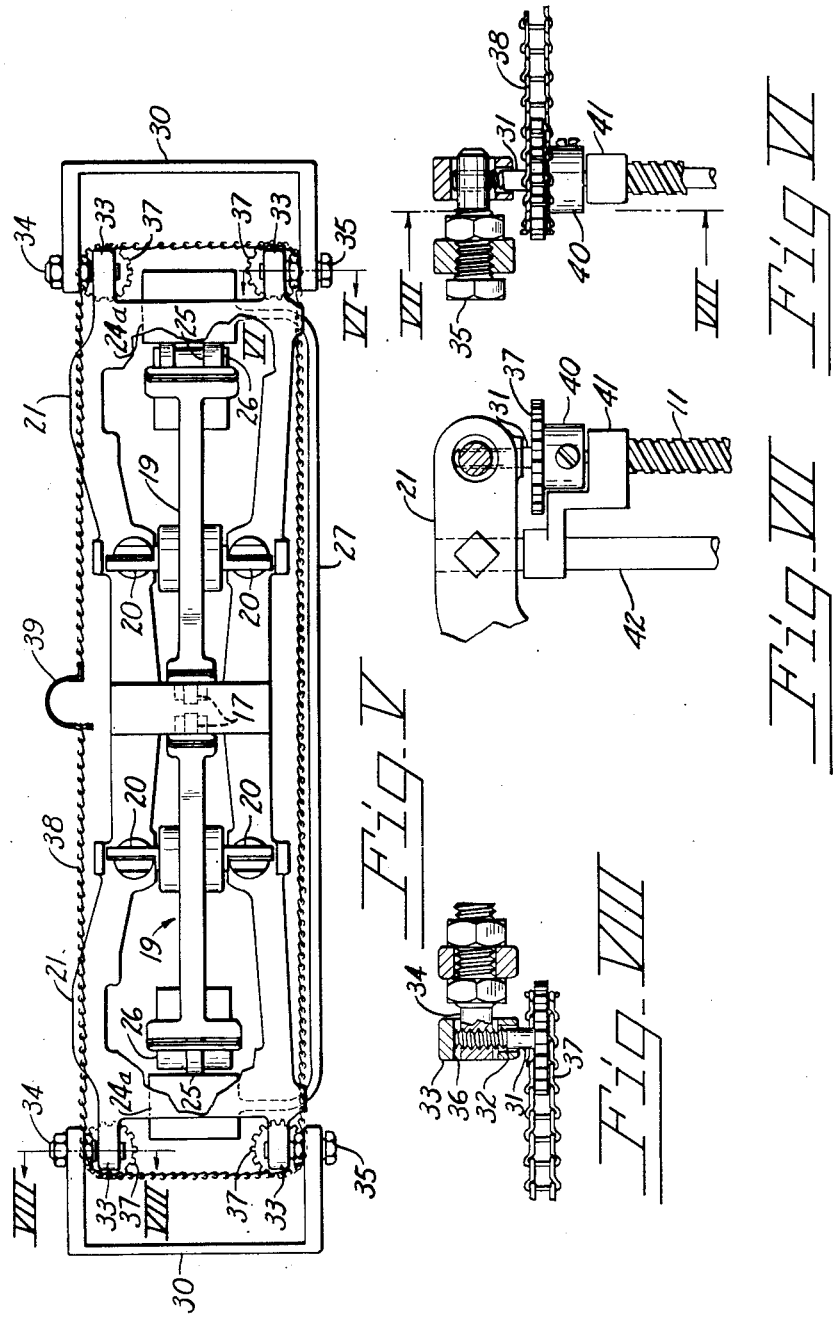
INVENTOR.
Lawrence S. Williams
BY
Marshall, Marshall & Leonard
ATTORNEYS

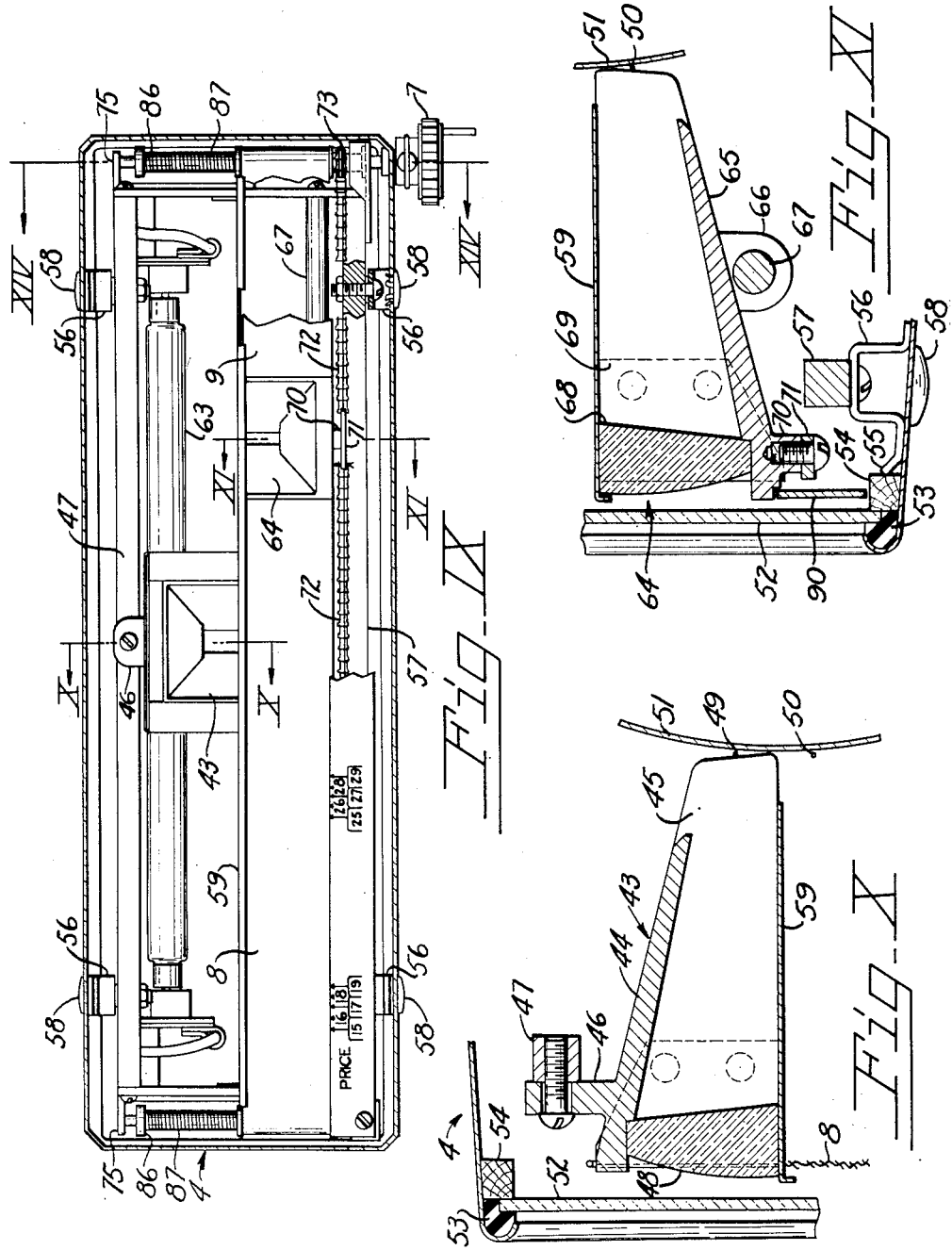

Feb. 16, 1954 L. S. WILLIAMS 2,669,154
MAGNIFYING VIEWER FOR WEIGHING SCALES
Filed March 24, 1949 6 Sheets-Sheet 5
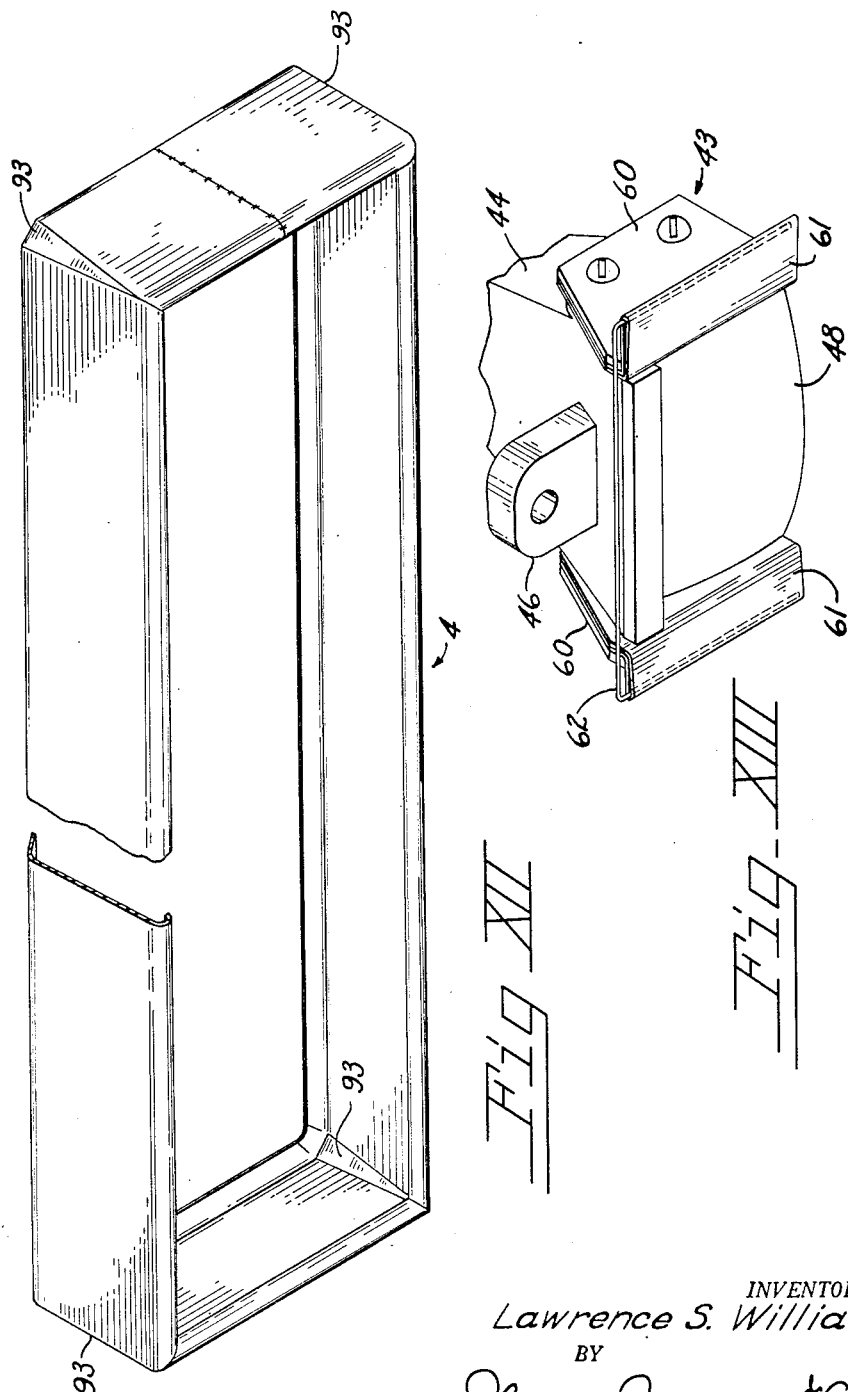

Feb. 16, 1954 L. S. WILLIAMS 2,669,154
MAGNIFYING VIEWER FOR WEIGHING SCALES
Filed March 24, 1949 6 Sheets-Sheet 6
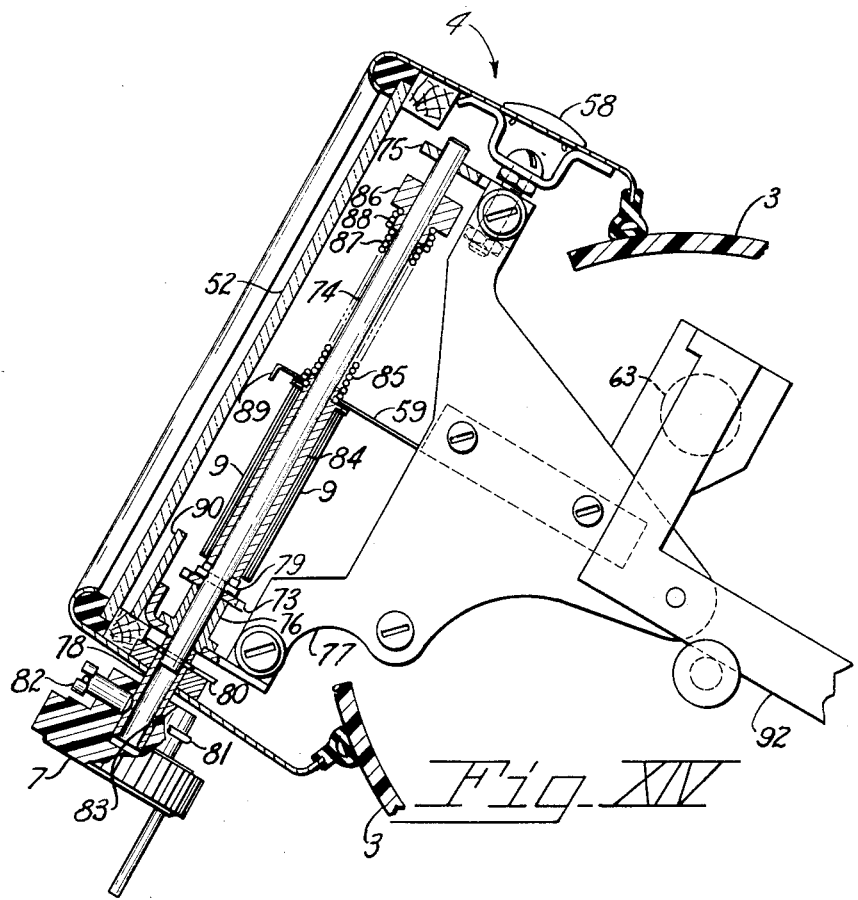
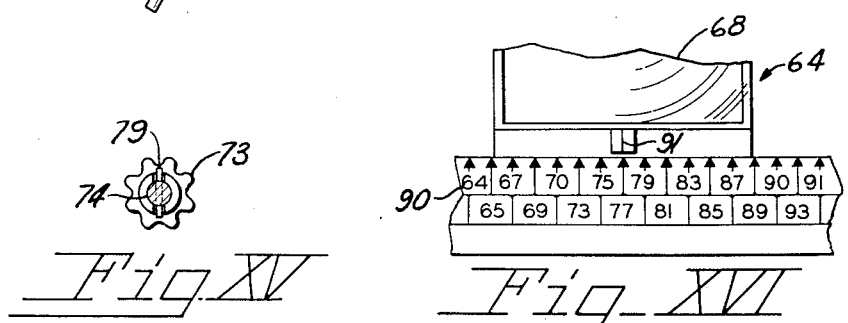
INVENTOR.
Lawrence S. Williams
BY
Marshall, Marshall & Leonard
ATTORNEYS

UNITED STATES PATENT OFFICE 2,669,154

MAGNIFYING VIEWER FOR WEIGHING SCALES

Lawrence S. Williams, Toledo, Ohio, assignor to Toledo Scale Company, Toledo, Ohio, a corporation of New Jersey Application March 24, 1949, Serial No. 83,200

7 Claims. (Cl. 88—1)

This invention relates to weighing scales and in particular to improved indicating mechanism and tare offsetting mechanism for a weighing scale employed in the packaging of retail meat and grocery items.

Many perishable food store items are being pre-packaged, i. e., packaged before being ordered by the customer, so that they may be sold in a self-service market. Many of these items consist of units of produce or meat that cannot be accurately divided according to weight units and the packages must, therefore, be priced individually according to the actual weight of the material and the price per unit of weight. For example, fresh fruits, vegetables, and fresh meats may be packaged for sale the same day.

While a conventional retail cylinder scale may be used for weighing and computing the money value of these pre-packaged items such a scale is inconvenient because there is no provision made for cancelling out the weight of the container or packaging material and because the operator must continually remember and with each weighing locate the proper column of computed amount indicia in determining the money value of the package.

While weighing scales have been built with a shiftable magnifying lens assembly for magnifying the value indicia such scales have been inconvenient to manufacture or use because of the complexity of the curtain arrangements employed to conceal those portions of the chart not being magnified and because of the difficulty of identifying the columns of value indicia as the lens assembly is being adjusted from one column to another.

Another disadvantage is the inability of the previously known constructions to provide a centrally located magnified weight indication in combination with a movable lens assembly that cooperates with columns of value indicia arranged on either side of the weight indicia.

The principal object of this invention is to provide a highly magnified image of a single column of value indicia while concealing from view all other value indicia and to identify the visible value indicia by the cooperation of a fully visible stationary price chart and an index movable with the lens assembly.

Another object of the invention is to provide magnified images of both weight and value indicia in a lens arrangement that permits normal viewing of the weight and value indicia and also permits the lens assembly cooperating with the value indicia to be moved to either side of the lens assembly cooperating with the weight indicia.

A still further object of the invention is to provide a simplified mechanism for moving the lens assembly that cooperates with the value indicia and that simultaneously positions curtains on either side of the lens assembly to conceal the unused portions of the chart.

A still further object of the invention is to provide a simplified housing for the lens assembly which housing may be easily constructed from straight strips of sheet metal.

An ancillary object of the invention is to provide a simplified mechanism for adjusting the scale to compensate for the weight of a container or other packaging material used in wrapping the commodity.

More specific objects and advantages are apparent from the following description of a specific embodiment of the invention.

According to the invention the improved indicating mechanism is made possible by providing a pair of circumferentially spaced reading lines one of which cooperates with the weight indicia on the chart and the other of which cooperates with the value indicia. A formed sheet metal lens housing is mounted from the frame of the scale in the region immediately overlying the reading lines. Within the lens housing is mounted a first lens assembly that cooperates with the weight indicia and a second lens assembly that is movable along the second reading line to selectively cooperate with the columns of value indicia. In order that the second lens assembly may cooperate with columns of value indicia arranged on either side of the column of weight indicia it is disposed at a different elevation within the lens housing from the first lens assembly so as to be movable past the first lens assembly. Parallax in reading the indications is avoided by bending the optical axes of each of the lens assemblies so that such axes are each perpendicular to the chart at their intersections with the respective reading lines and also intersect each other at the observer's eye level.

The invention further includes a provision of a stationary price chart all of which is always visible and which cooperates with an index on the movable lens assembly for identifying the particular column of value indicia then included in the field of view of the lens assembly. This lens assembly is movable along the reading line by a drive mechanism which also, acting through resilient members, maintains tension on spools that receive the unused portions of curtains extending laterally either side of the movable lens assembly.

The invention further includes a simplified mechanism for varying the spacing between the load counterbalancing pendulum assembly and the support for the chart of the weighing scale so that adjustment of such spacing may be employed to restore the chart indications to zero after the weight of an empty container or wrapping material has been placed on the weighing scale load receiver. In the preferred embodiment this mechanism comprises a plurality of jack screws supporting the pendulum mechanism.

The invention may be more readily understood from the following detailed description of a specific embodiment in which description reference is made to the accompanying drawings.

In the drawings:

Figure I is a perspective view of the improved weighing scale arranged for use on a low counter with the chart beneath the observer's eye level.

Figure II is a perspective view of the improved scale as constructed for use on contours of such height that the chart is at the observer's eye level.

Figure III is a side elevation with parts broken away indicating the general arrangement of the viewing mechanism and the tare offsetting mechanism.

Figure IV is a front elevation with parts broken away showing the position of the load counterbalancing mechanism.

Figure V is a plan view of the load counterbalancing mechanism showing the drive mechanism for the jack screws that support and elevate the pendulum frame.

Figure VI is a fragmentary vertical section taken along the lines VI—VI of Figure V.

Figure VII is a front elevation taken along the lines VII—VII of Figure VI.

Figure VIII is a detailed sectional view taken along the line VIII—VIII of Figure V.

Figure IX is a front elevation with parts broken away and other parts shown in section to illustrate the construction of the lens housing and the positions of the lens assemblies and drive mechanism therein.

Figure X is a vertical section taken substantially along the line X—X of Figure IX.

Figure XI is a vertical section along the line XI—XI of Figure IX.

Figure XII is an isometric view of the shell of the lens housing.

Figure XIII is a fragmentary perspective view of the lens assembly cooperating with the weight indicia.

Figure XIV is a vertical section taken substantially along the line XIV—XIV of Figure IX.

Figure XV is a detailed view of the connection between one of the drive sprockets and its spindle shown in elevation in Figure XIV.

Figure XVI is a fragmentary front elevation showing the cooperation between the fixed completely visible price chart and an index carried on the movable lens assembly.

These specific drawings and the accompanying description are intended merely to illustrate the invention but not to limit its scope.

Referring to Figures I and II, which show two models of the improved weighing scale differing only in the angular position of the indicating mechanism with respect to the housing of the scale, the improved scale has a load receiver 1 positioned above a forwardly extending portion of a base 2. A housing 3 erected from the rear portion of the base 2 encloses load counterbalancing mechanism and an indicating chart the latter being visible through magnifying lenses mounted in a lens housing 4 mounted on the front portion of the housing 3. The chart of the weighing scale has a column of weight indicia and a number of columns of computed value indicia computed according to various prices per unit of weight. Lenses mounted within the lens housing are arranged so that magnified weight indicia are visible through a first window 5 while magnified computed value indicia are visible through a movable window 6. The window 6 for the value indicia is movable along the length of the lens housing 4 by rotation of a drive knob 7 so that any one of a large number of columns of computed value indicia may be selected and singly displayed. Thus the only indicia visible at any one time are the weight indicia visible through the window 5 and a selected column of value indicia visible through the window 6. All other columns of value indicia are concealed behind curtains 8 and 9 extending laterally either side of the window 6. Chances of error in reading the wrong column of value indicia and the effort of selecting the proper column for each weighing when a number of weighings at a particular price are being made are thus eliminated.

The improved weighing scale also includes apparatus for producing relative motion between the support for the pendulum counterbalancing mechanism and the support for the rotatable chart. Relative motion between these parts causes a change in indication for a given load on the load receiver and thus permits the indication to be returned to zero even though an empty container is resting on the load receiver 1. The control for this adjusting mechanism includes a knob 10 located at the lower right front corner of the base 2 and connected through a flexible shaft 11 to mechanism 12 serving to raise or lower the load counterbalancing mechanism relative to the frame of the scale.

As may be seen in Figure III the flexible shaft 11 runs horizontally through the base portion 2 of the scale and then extends upwardly in the housing portion 3 where it connects to the elevating mechanism 12.

Figure III also illustrates in a general way the load receiver support. This support comprises a main lever 13 fulcrumed on bearings 14 set in the base 2 and having pivots to receive load bearings 15 of the load receiver 1. The load forces transmitted through the bearings 15 to the lever 13 are transmitted through its power pivot 16 to a pair of load ribbons 17 (see Figure IV) that extend upwardly within the upright housing portion 3 and are attached at their upper ends to power sectors 18 of a pair of load counterbalancing pendulums 19.

The pendulums 19, forming part of the load counterbalancing mechanism, are fulcrumed on knife edge pivots 20 that are supported on bearings mounted within a pendulum frame 21.

Load forces applied to the pendulums 19 are counterbalanced in part by pendulum weights 22 carried on downwardly extending arms 23 of the pendulums and in part by a rack drive frame 24 that is suspended by means of ribbons 25 from the upper ends of pendulum sectors 26 which sectors are concentric with respect to the knife edges of the pivots 20. The rack drive frame 24 includes a loading shelf or compartment 24a located adjacent each of the sectors 26 which shelves or compartments are connected by a bar 27 of which the end fragments only are shown in Figure IV.

The relationship of the power sectors 18 to the remainder of the pendulums 19 is such that the pendulums rotate through equal angles for equal increments of load applied to the load receiver 1. In consequence the rack drive frame 24 including the load shelves 24a moves vertically relative to the pendulum frame 21 through a distance that is proportional to the load on the weighing scale. A rack support 28 is connected to the rack drive loading shelf 24a appearing on the right in Figure IV and pivotally supports a rack rod 29 that extends upwardly into the upper portion of the housing 3 to cooperate with a pinion on the shaft of a cylindrical indicia bearing chart. Since the movement of the rack drive frame 24 including the shelves and bar 27 is directly proportional to load it follows that the movement of the chart is also directly proportional to the load.

In the weighing scale it is desirable to offset the weight of the packaging material or carton so that the scale indicates the net weight and value of the commodity contained within the package. Since the rotation of the cylindrical chart contained within the upper portion of the housing 3 is determined by the relative position of the rack drive frame 24 and the axis of the chart and since such relative movement may be produced by movement of either the chart axis or the pendulum frame relative to the other, movement of either of these members may be used to return the chart to zero indication without disturbing the weighing mechanism of the scale. In the embodiment shown in the drawings the pendulum frame 21 is lowered with respect to end standards 30 to return the chart to zero after the container has been placed on the load receiver. The direction of movement of the frame 21 to offset the tare load is downward because in the operation of the pendulums the rack 29 and the rack drive frame 24 are raised relative to the pendulum frame 21 as an increase in load is counterbalanced by the pendulums. Thus to offset the tare load it is necessary to either raise the chart axis or lower the pendulum frame 21 including the pendulums and the mechanism supported thereby. Either adjustment has the effect of lengthening the rack rod 29.

In order that the pendulum frame 21 may be conveniently raised or lowered it is supported at each of its corners on a jack screw 31 (Figure VIII) which jack screw extends upwardly from below through a clearance hole 32 is an ear 33 of the pendulum frame 21 and is threaded through a vertical hole in the end of a stud 34 or 35 extending horizontally from the side of the upright 30 and through a horizontal hole 36 in the ear 33. The upper end of the jack screw bears against the top side of the horizontal hole 36. There is sufficient clearance between the outside diameter of the studs 34 or 35 and the diameter of the holes 36 through which they pass to permit the required vertical movement of the pendulum frame 21. The movement of the pendulum frame 21 is accomplished by rotating the jack screws 31 so that they either advance or retreat vertically through the studs 34 and, since the pendulum frames are supported vertically from the upper ends of the jack screws 31, the frame 21 is raised or lowered in proportion to the jack screw rotation.

The jack screws 31 are each provided with a sprocket 37 and the sprockets are interconnected by a chain 38 that passing around the pendulum frame engages each of the sprockets and insures synchronized rotation of the jack screws. The ends of the chain are connected by a stiff U-shaped spring 39 that maintains the chain 38 under sufficient tension to drive the screws. The sprocket 37 at the right front corner of the pendulum frame has a downwardly directed hub 40 into which the end of the flexible shaft 11 is secured. This connection permits the sprockets 37 and jack screws 31 to be rotated by force applied through the tare control knob 10.

The end of the casing of the flexible shaft 11 adjacent the hub 40 of the sprocket 37 is securely held in a bracket 41 attached to a depending member 42 of the pendulum frame 21 so that this end of the flexible shaft moves up and down with the pendulum frame 21.

Depending upon the construction of the scale it may be desirable to tilt the pendulum frame slightly as it is being raised or lowered. This is accomplished by using different pitched threads on the jack screws or sprockets with different numbers of teeth on the front and back sides of the pendulum frame 21.

In the improved scale the indicia bearing chart is viewed through the lens housing 4 (Figure IX) in which is fixedly mounted a first lens assembly 43 in the space behind the window 5 appearing in Figures I or II. This lens assembly is shown in vertical section in Figure X and in perspective in Figure XIII. It comprises a lens cell 44 of generally frusto-pyramidal shape having an open bottom and converging side walls 45. An ear 46 extending upwardly from the top side of the lens cell 44 is attached to a support bar 47 forming part of the framework within the lens housing 4. A magnifying lens 48 is mounted in the larger end of the lens cell 44 and comprises an off center section or portion of a spherical lens and is furthermore set at an angle to the center line of the lens cell 44 so that it acts optically as a combination of a magnifying lens and prism. The center line of the lens cell 44 is arranged to approximately coincide with a plane including a reading line 49, the upper one of a pair of spaced reading lines 49 and 50, and extending perpendicular to the surface 51 of the chart.

The upper portion of the lens housing 4 extending to either side of the lens assembly 43 is connected behind opaque portions of a glass sheet 52 forming the front face of the lens housing 4.

The glass sheet 52 is held in place against a soft rubber gasket 53 by a plurality of wood strips 54 inserted between the glass and upturned points 55 (Figure XI) of generally U-shaped attaching brackets 56 welded to the inside of the top and bottom of the lens housing 4. The shell of the lens housing 4 is advantageously attached to the supporting framework including the bar 47 and a similar bar 57 by a plurality of screws engaging the brackets 56 and the bars 47 and 57 and that are accessible through openings in the shell. The openings are closed by snap buttons 58.

The lens cell 44 of the first lens assembly 43 is open on its bottom side to facilitate manufacture. When the lens cell 44 is installed in the lens housing 4 a generally horizontally divider 59 extending lengthwise of the housing 4 serves as the bottom of the lens cell 44. This divider 59 extends generally perpendicular to the glass window 52 and if extended toward the chart would intersect the chart along a line parallel to and midway between the reading lines 49 and 50.

The lens cell 44 is shown in greater detail in Figure XIII and as illustrated it includes a pair of side plates 60 that are attached to the sides of the cell and that serve to clamp the ends of a pair of short curtains 61 that extend laterally either side of the lens assembly. The curtains are held in extended position by a U-shaped wire spring 62 the legs of which are inserted into loops formed in the curtains. The curtains are long enough so that there is no possibility of light leakage from a fluorescent lighting tube 63 past the sides of the lens assembly 43 and out through the central transparent area of the upper half of the glass window 52.

A second lens assembly 64 is mounted in the lens housing 4 immediately beneath the divider 59. This assembly, as shown in detail in Figure XI, comprises a frusto-pyramidal lens cell 65 that is open along its upper side where it abuts the divider 59 and that has a pair of depending ears 66 engaging a guide rod 67 mounted in the framework within the lens housing 4. A lens 68 is mounted in the larger end of the lens cell 65 and is retained in position by a pair of side plates 69 that are attached to the sides of the cell 65. The lens 68 like the lens 48 is formed of an off center section of a spherical lens and is mounted within a lens cell so that it acts both as lens and prism. The lenses 43 and 68 are further oriented so that their optical axes, the paths of unrefracted rays through the lens, intersect at the observer's eye level and each intersect the reading line associated therewith. Thus each of the lenses, although off center, includes the center section of the complete spherical lens with such optical center located near the divider 59.

The magnification of each of the lenses and its distance from the reading line is selected according to the desired magnification of the chart indicia and the slopes of the sides of the lens cells 44 and 65 are further selected so that when viewed through the lenses the sides of the cells appear to be parallel or nearly so and to frame the associated columns of indicia.

The use of at least one lens that is off center to provide prismatic effect is necessary if the lenses are to be separated in elevation (to avoid interference as the second one is moved) and still keep each reading line centered in the field of view of the associated lens and the apparent viewing angle normal to the chart.

The second lens assembly 64 includes a downwardly directed boss 70 and a chain attaching plate 71 to which a drive chain 72 is attached. The chain 72, preferably of the ladder type, is led over sprockets 73 one located at each end of the housing. The sprockets 73 are mounted on shafts 74 (Figure XIV) which shafts are journaled at their upper ends in brackets 75 extending from the framework within the lens housing 4 and at their lower ends in bushings 76 which in turn are mounted in forwardly extending ears of side plates 77 of the frame work. The shaft 74 at the right hand end of the lens housing 4 has a downwardly extending tubular extension 78 that carries the control knob 7 on its lower end. Rotation of the knob 7, driving through the shaft 74 (at the right hand end of the housing), the sprocket 73, and the chain 72, drives the lens cell 65 along the length of the housing 4 so that any selected column of value indicia may be brought into the field of view of the lens 68.

The details of the construction of the drive are illustrated in Figure XIV. The sprockets 73 each have an upwardly directed slotted hub to receive a cross pin 79 fitted through the shaft 74. This provides a positive connection between the sprocket and the shaft without requiring extremely close tolerances in assembly or fastening devices that may become loose in operation. The downwardly directed shaft extension 78 is slipped over the lower end of the shaft 74 and a cotter key 80 holds the extension in place. The drive knob 7 is frictionally held onto the shaft extension 78. The frictional connection rather than a rigid connection is employed at this point so that the connection may serve as a safety clutch and thus prevent damage to the lens assembly 64 should one attempt to drive it beyond its limits of travel. The amount of friction is controlled by a ring shaped spring 81 that encircles the hub of the knob 7 and engages a slot in the end of a pin 82 to urge the pin into a groove 83 formed in the shaft extension 78. The friction between the end of the pin 82 and the shaft extension 83 is normally sufficient to drive the lens assembly while the presence of the groove prevents the knob 7 from falling or working downwardly off the shaft extension 78.

The curtains 8 and 9 extending either side of the movable lens assembly 64 are wound onto spools 84 that are sleeved over the shafts 74. The spools 84 are loose on the shafts and are resiliently urged in a direction to maintain the curtains 8 and 9 under tension. This is accomplished by connecting spool hubs 85 to collars 86 by means of helical springs 87 sleeved on the shafts 74 with their ends gripping the hubs 85 and hubs 88 of the collars 86.

This resilient connection is easy to manufacture and assemble and in a simple manner accommodates the variable rotation of the spools 84 with respect to the shafts 74 as the lens is moved. The variable rotation of the sleeves is required because the movement of the lens is linear with respect to shaft rotation while the rotation of the spools must vary according to the amount of the curtain that is wound onto the spool. By resiliently connecting the spool to the shaft the connection need accommodate only the difference in rotation whereas if the spring were attached to a stationary member it would have to accommodate the several revolutions of the spool 84 as the curtain is wound onto or off the spool.

The divider 59 has a downwardly extending flange 89 on its forward edge adjacent the glass 52 and this downwardly directed flange in combination with a price chart 90 serves as a track and mask to guide and conceal the top and bottom edges of the curtains 8 and 9.

The price chart 90, see also Figure XVI, is always visible in its entirety through the glass window 52 and is provided with indicia corresponding to the columns of value indicia printed on the cylindrical chart of the scale. These price indicia in Figure XVI appear to be very closely spaced because they are viewed directly whereas equally closely spaced columns of value indicia are viewed through the lens 68 at considerable magnification and thus appear more widely spaced. An index line 91 scribed on a forwardly directed surface of the lower front wall of the lens cell 65 cooperates with the price indicia to identify the column of value indicia then in the field of view of the lens 68. This arrangement is much more satisfactory than the use of a conventional price chart located adjacent the reading line 50 and viewed through the lens. If the price chart is viewed through the lens it appears to move in the opposite direction from the movement of the lens thus making it difficult to identify the indicia thereon as the lens is moved rapidly from one location to another. The illustrated arrangement having a moving index line on the lens assembly cooperating with a fully visible non-magnified price chart permits the operator to locate his price and then easily move the lens assembly until the index registers with the selected price. There is no apparent indicia movement in this arrangement to distract the operator or to render it difficult to identify the proper lens position as such position is being approached.

The end plates 77 of the framework within the lens housing 4 are pivotally supported from extensible brackets 92 of the frame of the weighing scale at points which are normally located midway between the ends of the reading lines 49 and 50. Those portions of the housing 3 located immediately behind the lens housing 4 are cylindrical about the pivoting point of the frame as an axis. This allows the frame to be rotated up or down to accommodate differences in eye level of various observers.

The lens housing 4 (see Figure XII) is slightly pyramidal in shape and has the glass window 52 in its smaller base. An ancilliary feature of the invention is to form this lens housing shell with beveled corners 93 with the beveled corners increasing in width toward the larger base of the shell which is positioned adjacent the housing 3. By forming the corners with such a tapering bevel the perimeters of the bases may be maintained substantially equal and yet obtain sufficient space so that the glass window 52 may be worked into place within the completed shell. This provision of substantially equal perimeters for the two bases of the frusto-pyramidal shell allows it to be formed by bending only from strips of sheet metal and thus avoid the cost of expensive drawing dies that would otherwise be required.

This improved scale is of particular advantage in the packaging of items of various weights and similar prices inasmuch as the movable lens assembly may be located to display the desired column of value indicia corresponding to the selected price while concealing all other value indicia from view. Thus for any price within the range of the scale there are only two indications to the operator, namely the weight indicia displayed through the first lens assembly 43 and the value indicia corresponding to the selected price and displayed through the lens assembly 64.

In addition to this improved viewing assembly this scale retains the accuracy of pendulum counterbalancing of load while providing a "dead" tare adjustment. The tare adjustment is "dead" since the operator need not touch any of the moving parts of the weighing mechanism as he makes a tare adjustment. This materially reduces the time for making the adjustment because the indicator responds as the tare device is adjusted and there is no need to make an adjustment and then wait until the scale can react as is the case with the ordinary "live" tare adjustment or poise mechanism.

Various modifications may be made in the construction of various parts of the improved weighing scale without departing from the spirit and scope of the invention.

Having described the invention, I claim:

1. In a cylindrical chart weighing scale, in combination, a chart having columns of weight and value indicia, a pair of reading lines adjacent the chart one for the weight indicia and one for the value indicia, said reading lines being on the same side of the chart and spaced from each other circumferentially of the chart, a viewing mechanism comprising a fixed lens assembly for presenting a magnified image of the weight indicia and reading line and a movable lens assembly the path of which is adjacent the fixed lens and which selectively cooperates with any of the columns of value indicia, a price chart mounted on the viewing assembly in full view adjacent the path and outside the field of view of the movable lens assembly and an indicator mounted on the movable lens assembly and cooperating with the price chart for identifying the column of value indicia then in the field of view of the movable lens assembly.

2. In a cylindrical chart weighing scale, in combination, a chart having columns of weight and value indicia, a pair of reading lines adjacent the chart one for the weight indicia and one for the value indicia, said reading lines being adjacent each other on the same side of the chart and spaced from each other circumferentially of the chart, a tiltable viewing assembly comprising a fixed lens assembly for presenting a magnified image of the weight indicia and reading lines and a movable lens assembly that cooperates singly with the columns of value indicia, said movable lens assembly being arranged at an elevation different from the fixed lens assembly so as to be movable to either side of the fixed lens assembly, means for moving the lens assembly and determining its position relative to the value indicia, and similar optical deflecting elements in each of the lens assemblies for deflecting the optical axis of each assembly toward the other so that the optical axes from a common viewing point through the different lens assemblies are each normal to the chart at the reading line.

3. In a cylindrical chart weighing scale, in combination, a chart having columns of value indicia arranged on either side of a column of weight indicia, a reading line cooperating with the weight indicia, another reading line spaced from the first and cooperating with value indicia, a tiltable viewing mechanism comprising a fixedly mounted lens assembly for presenting a magnified view of the weight indicia and a second lens assembly movable along the reading line that cooperates with the value indicia for presenting a magnified view of a selected column of value indicia, the path of said second lens assembly being located vertically adjacent the fixed lens assembly such that the weight and value indications are vertically juxtaposed, a prismatic system included in each lens assembly so that optical paths perpendicular to the surface of the chart at the reading lines intersect at the observer's eye level, and means for concealing all the value indicia not included in the field of the second lens assembly.

4. In a cylindrical chart weighing scale in combination, a chart having columns of value indicia arranged on either side of a column of weight indicia, a reading line cooperating with the weight indicia, a second reading line spaced from the first and cooperating with the value indicia, a lens housing mounted on the frame of the weighing scale, a shelf dividing the lens housing into an upper and a lower compartment, a first lens assembly mounted in one of the compartments for magnifying the weight indicia, a second lens assembly movably mounted in the other compartment for magnifying a selected column of value indicia, a price chart mounted in the front part of the lens housing and outside the field of view of either lens, an index on the second lens assembly to cooperate with the price chart, and means for moving the second lens assembly.

5. In a cylindrical chart weighing scale, in commination, a chart having columns of value indicia arranged on either side of a column of weight indicia, a reading line cooperating with the weight indicia, a reading line cooperating with the value indicia, a lens housing mounted from the frame of the scale and positioned over the reading lines, a first lens assembly mounted in the housing in position to magnify the weight indicia, a second lens assembly movably mounted in the housing to magnify a selected column of value indicia, a shaft journaled in each end of the lens housing perpendicular to the path of the movable lens, a control knob on one of the shafts, a positive drive from the shafts to the movable lens assembly for moving the lens assembly, a pair of flexible curtains one extending in each direction from the movable lens assembly and along the path thereof, a spool loosely sleeved over each shaft for receiving the curtains, resilient means connecting the spools to the shafts for holding the curtains under tension, a price chart extending along the path of the movable lens and outside its field of view, and an index on the movable lens cooperating with the chart to identify the value column then in the field of view.

6. In a cylindrical chart weighing scale, in combination, a chart having columns of value indicia and a column of weight indicia, a reading line cooperating with the value indicia, a second reading line spaced from the first and cooperating with the weight indicia, a lens housing mounted from the frame of the scale and positioned over the reading lines, a divider mounted in the lens housing and lying in a plane passing between the reading lines, a lens assembly fixedly mounted on one side of the divider in position to magnify the weight indicia, a second lens assembly for magnifying selected columns of value indicia, a rod mounted in the lens housing, said rod and said divider forming a track along which the second lens assembly may be moved, a price chart extending along the path of the second lens assembly and outside the field of view of the lens assembly, curtains movable with the lens assembly for concealing the chart, and a flange on the divider, said flange and said price chart forming a track for the curtains and concealing the edges thereof.

7. In a cylindrical chart weighing scale, in combination, a frame, a chart having columns of value indicia, a lens assembly movably mounted on the frame to magnify a portion of a selected column of indicia, a pair of shafts journaled in the frame, a control knob on one of the shafts, a positive drive interconnecting the shafts and the movable lens assembly for moving the lens assembly, a pair of flexible curtains one extending in each direction from the movable lens assembly and along the path thereof, a spool loosely sleeved over each shaft for receiving the curtains, and resilient means connecting the spools to the shafts for holding the curtains under tension, whereby said resilient means maintains substantially constant tension in said curtains as the movable lens assembly is moved from one end of its range of movement to the other.

LAWRENCE S. WILLIAMS.

References Cited in the file of this patent

UNITED STATES PATENTS

| Number | Name | Date |
|---|---|---|
| 998,414 | Smith | July 18, 1911 |
| 1,084,254 | Cashel | Jan. 13, 1914 |
| 1,151,008 | Guthrie et al. | Aug. 24, 1915 |
| 1,169,761 | Bausch | Feb. 1, 1916 |
| 1,539,830 | Culver | June 2, 1925 |
| 1,918,877 | Templeton | July 18, 1933 |
| 1,973,685 | Marshall | Sept. 11, 1934 |
| 1,987,245 | Reussengehn | Jan. 8, 1935 |
| 2,198,714 | Williams | Apr. 30, 1940 |
| 2,366,947 | Williams | Jan. 9, 1945 |